US006542453B1

(12) United States Patent
Yamada et al.

(10) Patent No.: US 6,542,453 B1
(45) Date of Patent: Apr. 1, 2003

(54) RECORDING MEDIUM READ DEVICE

(75) Inventors: Yoshinori Yamada, Saitama-ken (JP); Takashi Komiyama, Saitama-ken (JP); Yasuhiro Shinkai, Saitama-ken (JP); Koji Asao, Saitama-ken (JP)

(73) Assignee: Pioneer Corporation, Tokyo (JP)

(*) Notice: Subject to any disclaimer, the term of this patent is extended or adjusted under 35 U.S.C. 154(b) by 202 days.

(21) Appl. No.: 09/680,210

(22) Filed: Oct. 6, 2000

(30) Foreign Application Priority Data

Oct. 8, 1999 (JP) .......................................... 11-288764
Oct. 8, 1999 (JP) .......................................... 11-288766

(51) Int. Cl.[7] .................................................. G11B 3/58
(52) U.S. Cl. ..................... 369/77.1; 369/77.2; 369/75.2
(58) Field of Search ............................... 369/77.1, 75.2, 369/204, 77.2; 360/99.06

(56) References Cited

U.S. PATENT DOCUMENTS 5,031,169 A * 7/1991 Kato et al. .................. 369/233
5,195,077 A * 3/1993 Ishikawa et al. ........... 369/75.2
5,828,641 A * 10/1998 Abe et al. .................. 369/75.1
6,147,948 A * 11/2000 Tanaka et al. ............. 369/77.1
6,272,093 B1 * 8/2001 Kurozuka et al. ......... 369/77.2

* cited by examiner

*Primary Examiner*—William Korzuch
*Assistant Examiner*—Mark Blouin
(74) *Attorney, Agent, or Firm*—Arent Fox Kintner Plotkin & Kahn, PLLC

(57) ABSTRACT

Positioning means (5) for positioning a recording medium at a predetermined position on a read mechanism of a device after the recording medium loaded into a loading opening (11) has been transported to the read mechanism or a detector means for detecting that the recording medium has been positioned is provided pivotably about one end thereof inside the device. The positioning means (5) comprises first positioning portion (52) for positioning a recording medium of a smaller diameter and a second positioning portion (53) for positioning a recording medium of a larger diameter. The detector means comprises a first detector member (52*a*) for contacting with the rim of the recording medium of the smaller diameter and a second detector member (53*a*) for contacting with the rim of the recording medium of the larger diameter. The device is adapted such that, when the recording medium of the larger diameter is transported, the first positioning portion (52) or the first detector member (52*a*) is retreated from the transport passage for the recording medium of the larger diameter.

15 Claims, 13 Drawing Sheets

22a 27 28 22b 22 22d 23 26 23 22d 22c 24 22c 24a 25 22 22b 2 6

1
6
7
22c
22
11
2
21
12
21
12
22c
22
3
31

6
2
22b
22
22d
23
26
22c
25
24a
28
23
24
27
22d
22a
22b
22
22c 7
7A
7B
8
7
7A
7B
8

RECORDING MEDIUM READ DEVICE

BACKGROUND OF THE INVENTION

The present invention relates to recording medium read devices. More particularly, it relates to a recording medium read device with an improved positioning mechanism for positioning a disc at a clamp position of a turntable and an improved detector mechanism for detecting the positioning, when a disc such as a compact disc (CD) has been loaded therein.

Recently, read devices have become widespread which employ discs such as CDs or DVDs as a recording medium. Among these disc read devices, for example, a vehicle-mounted device (a CD player) 1 as shown in FIG. 14 has been developed to enjoy music inside vehicles.

Such a device is adapted to perform positioning by centering each of the disc 8 cm in diameter and the disc 12 cm in diameter, loaded into the read device, on the read mechanism.

An example of the centering mechanism comprises a pair of right and left centering arms, provided on a clamper arm, with a positioning portion for positioning a loaded disc on the read mechanism, and a centering lock arm for positioning the positioning portion of the centering arm at a predetermined position.

The positioning portion is adapted to be on standby at a position where the 8 cm disc can be positioned on the read mechanism and adapted to be pushed by a 12 cm disc to move to a rear portion of the device when the 12 cm disc is loaded. That is, when the 8 cm disc is loaded, the centering arms are locked by the centering lock arm to position the 8 cm disc on the read mechanism. When the 12 cm disc is loaded, the centering arms are unlocked to position the 12 cm disc on the read mechanism.

In addition, a detector member for detecting that a disc has been positioned on the read mechanism is provided on the aforementioned positioning portion. The detector portion is adapted to move, by the movement of the positioning portion, between the position for detecting the 8 cm CD and the position for detecting 12 cm CD.

However, in the aforementioned example of the prior art, the aforementioned members are required for positioning the 8 cm and 12 cm discs and for detecting that the disc has been positioned, thus increasing the number of parts used.

In addition, the device is adapted to allow the positioning portion and the detector portion to move a great deal, thereby adversely affecting the positioning accuracy for positioning each type of disc.

SUMMARY OF THE INVENTION

The present invention was suggested to solve these problems, and an object of the present invention is to provide a recording medium read device which requires less number of parts, which can position a disc transported into the device at the read position with accuracy, which can detect with accuracy that the disc has been positioned, and which can further reduce the device in size.

To achieve the object, the invention according to claim 1 provides a recording medium read device comprising a loading opening for allowing a recording medium of a smaller and a larger diameter to be loaded therethrough and a read mechanism for reading the recording medium. The invention is characterized in that a positioning means for positioning the recording medium loaded into the loading opening to a predetermined position relative to the read mechanism is provided inside the device; the positioning means has a first positioning portion for positioning a recording medium of the smaller diameter and a second positioning portion for positioning a recording medium of the larger diameter in the same member; and when a recording medium of the larger diameter is transported, the first positioning portion is retreated from a transport passage for the recording medium of the larger diameter.

According to the invention of claim 1, the first and second positioning portion are formed in the positioning means.

When a recording medium of a smaller diameter transported into the read mechanism, for example, a recording medium 8 cm in diameter is positioned, the first positioning portion is used for positioning the medium.

When a recording medium of a larger diameter, for example, a recording medium 12 cm in diameter is positioned, the second positioning portion is used for positioning the medium.

Moreover, when the recording medium of the larger diameter is transported, the first positioning portion is retreated from the transport passage.

Consequently, the positioning portions for each type of recording medium can be formed on the same member, thereby reducing the device in size and the number of parts.

The invention according to claim 2 is characterized in that the positioning means is movable so that the first positioning portion is retreated in a direction generally perpendicular to a recording surface of the recording medium being transported.

According to the invention of claim 2, the positioning means is moved so that the first positioning portion is retreated in a direction generally perpendicular to a recording surface of the recording medium being transported, thereby positively preventing interference with the recording medium being transported.

The invention according to claim 3 is characterized in that the second positioning portion is located at a position for positioning the recording medium of the larger diameter after the first positioning portion has been retreated.

According to the invention of claim 3, the second positioning portion is adapted to be located at a position for positioning the recording medium of the larger diameter after the first positioning portion has been retreated. This makes it possible to positively position the transported recording medium of the larger diameter on the read mechanism.

The invention according to claim 4 is characterized in that the positioning means is disposed in a deep portion of the device and is pivotably tilted about a shaft generally parallel to the recording surface of the recording medium.

According to the invention of claim 4, the positioning means is adapted to be disposed in a deep portion of the device and pivotably tilted about a shaft generally parallel to the recording surface of the recording medium. This allows the positioning means to move only a small amount particularly in the vertical direction of the device, thereby reducing the device in size and particularly reducing it in thickness.

The invention according to claim 5 is characterized in that the positioning means can be moved by a transport force of the recording medium of the larger diameter.

The invention according to claim 6 is characterized in that the device further comprises a contact member for contacting with a rim of the recording medium of the larger diameter and the contact member moves to allow the positioning means to move.

The invention according to claims 5 and 6, the positioning means is adapted to be tilted when the recording medium of the larger diameter is transported. Particularly, since the transportation of the recording medium of the larger diameter can be detected by the contact member, detection and control can be mechanically carried out, thereby providing more ensured detection than with sensors.

The invention according to claim 7 provides a recording medium read device comprising a loading opening for allowing a recording medium of a smaller and a larger diameter to be loaded therethrough and a read mechanism for reading the recording medium. The invention is characterized in that detector means for detecting that the recording medium loaded into the loading opening has been positioned to a predetermined position relative to the read mechanism is provided inside the device; the detector means has a first detector member for contacting a rim of the recording medium of the smaller diameter and a second detector member for contacting a rim of the recording medium of the larger diameter; and when the recording medium of the larger diameter is transported, the first detector member is retreated from a transport passage for the recording medium of the larger diameter.

According to the invention of claim 7, the first and second detector member makes it possible to detect that a recording medium of a smaller diameter such as a recording medium 8 cm in diameter or a recording medium of a larger diameter such as a recording medium 12 cm in diameter has been positioned on the read mechanism. Furthermore, the first detector member is adapted to be retreated from the transport passage of the recording medium of the larger diameter when the recording medium of the larger diameter is transported.

This makes it possible to perform read action accurately and quickly after the recording medium has been loaded.

In addition, the first and second detector member are located in the transport passage of the recording medium. The detector member is adapted to be retreated from the transport passage of the recording medium of the larger diameter according to the recording medium to be loaded, thereby reducing the device in size.

The invention according to claim 8 is characterized in that the detector means is movable so that the first detector member is retreated in a direction generally perpendicular to a recording surface of the recording medium being transported.

The invention according to claim 9 is characterized in that the second detector member is located at a position for positioning the recording medium of the larger diameter after the first detector member has been retreated.

According to the invention of claims 8 and 9, the detector means is moved so that the detector member is retreated in a direction generally perpendicular to a recording surface of the recording medium, thereby preventing the detector means from interfering with the recording medium to allow the recording medium of a smaller and larger diameter to be positively positioned. This makes it possible to read appropriately the recording medium.

The invention according to claim 10 is characterized in that the detector means is disposed in a deep portion of the device and is pivotably tilted about a shaft generally parallel to the recording surface of the recording medium.

According to the invention of claim 10, the detector means is pivotably tilted, thereby allowed to rotate (move) slightly. This makes it possible to minimize the space for the movement and thus reduce the device in size.

The invention according to claim 11 is characterized by further comprising a positioning means having, in the same member, a first positioning portion for positioning the recording medium of the smaller diameter and a second positioning portion for positioning the recording medium of the larger diameter and in that the first detector member is provided by being slightly protruded from the first positioning portion and the second detector member is provided by being slightly protruded from the second positioning portion.

The invention according to claim 12 is characterized in that the detector members and the positioning means are provided on the same support means.

The invention according to claim 13 is characterized in that the first detector member and the second detector member are formed on the same detector arm and the detector arm is pivotably journaled.

According to the invention of claims 11, 12, and 13, the first positioning portion for positioning the recording medium of the smaller diameter and the second positioning portion for positioning the recording medium of the larger diameter can be formed of the same member. This makes it possible to reduce the number of parts used and the device in size, and simplify the device.

The invention according to claim 14 is characterized by further comprising a transmission member for moving a predetermined distance by rotation of the detector arm and in that the transmission member moves to cause the support member to move in a direction to release the contact between the positioning means from the recording medium.

According to the invention of claim 14, the transmission member is adapted to move to cause the support means to move in such a direction as to release the contact between the positioning means and the recording medium. This makes it unnecessary to use a complicated sensor or the like and improves the accuracy of operation. Furthermore, it is made possible to reduce the cost and size of the device.

BRIEF DESCRIPTION OF THE DRAWINGS

The present invention, together with objects and advantages thereof, may best be understood by reference to the following description of the presently preferred embodiments together with the accompanying drawings in which.

DETAILED DESCRIPTION OF THE PREFERRED EMBODIMENTS

Preferred embodiments of a recording medium read device according to the present invention will be explained below with reference to the accompanying drawings. Incidentally, the recording medium read device according to the present invention is intended to read discs such as CDs and DVDs. However, CDs are taken as an example for explanation of the embodiments below.

Figure 1:
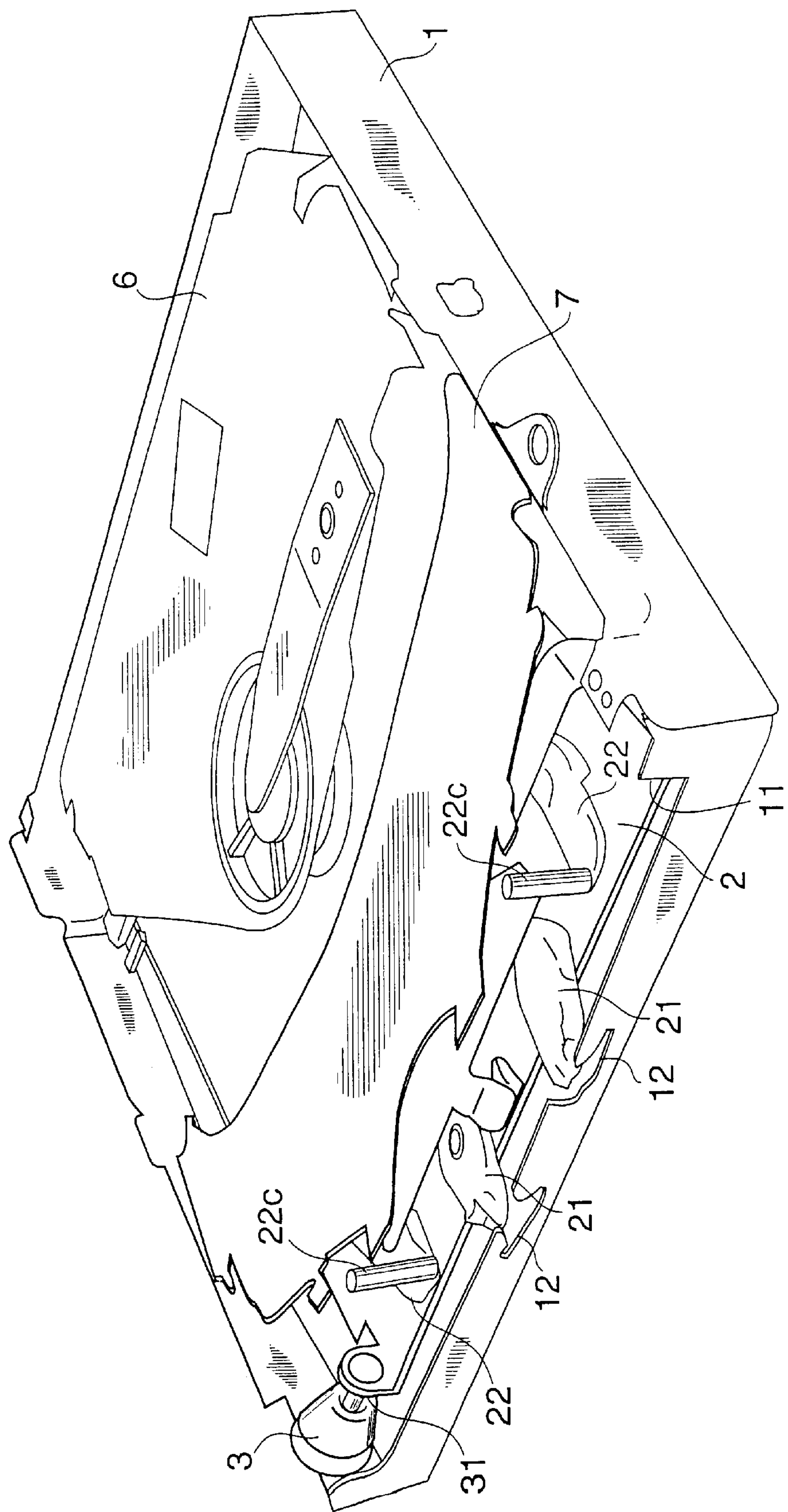
FIG. 1 is a perspective view illustrating an entire recording medium read device according to an embodiment of the present invention.
Figure 2:
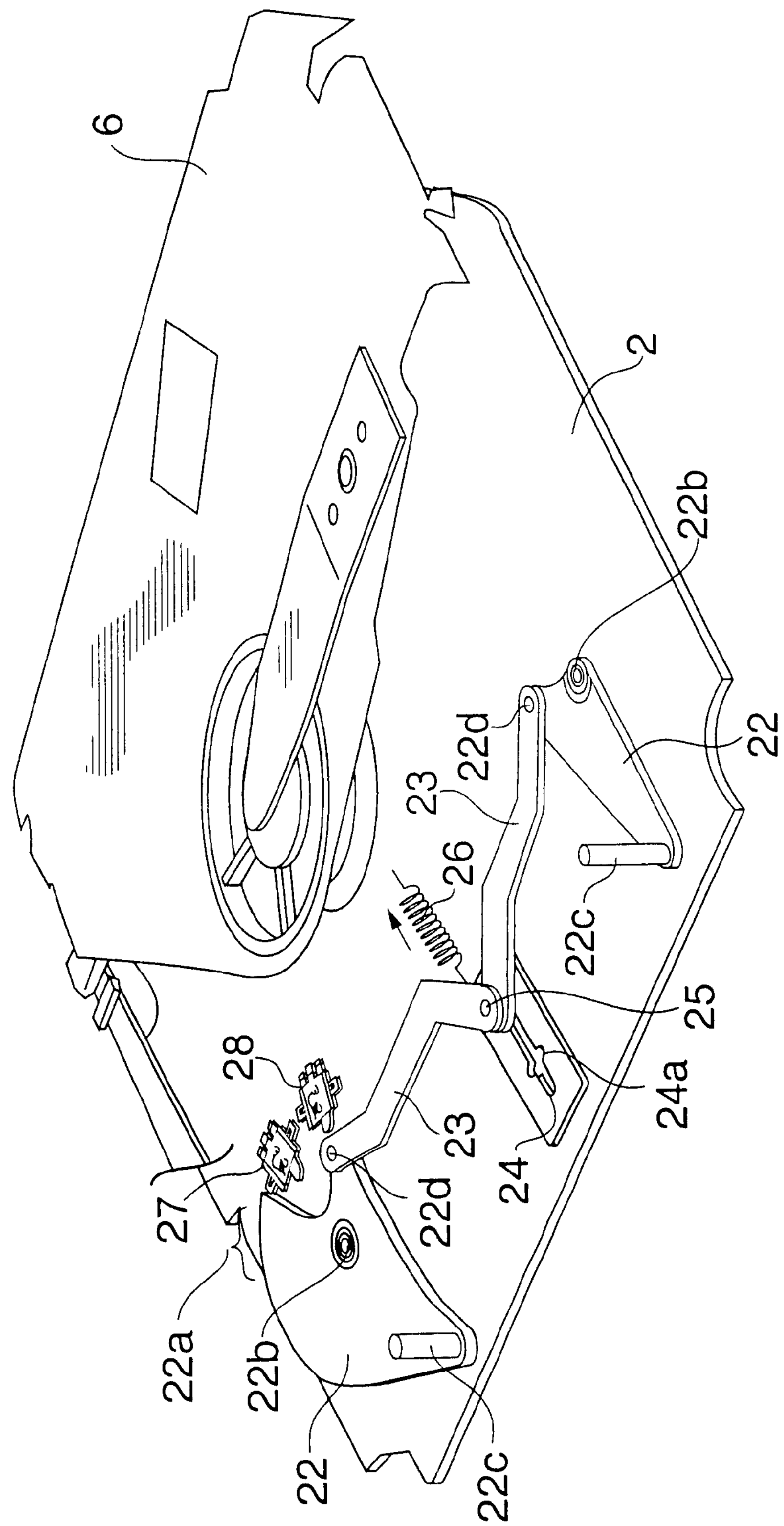
FIG. 2 is a schematic perspective view illustrating the chassis or the main portion of a recording medium read device according to an embodiment of the present invention.
Figure 3:
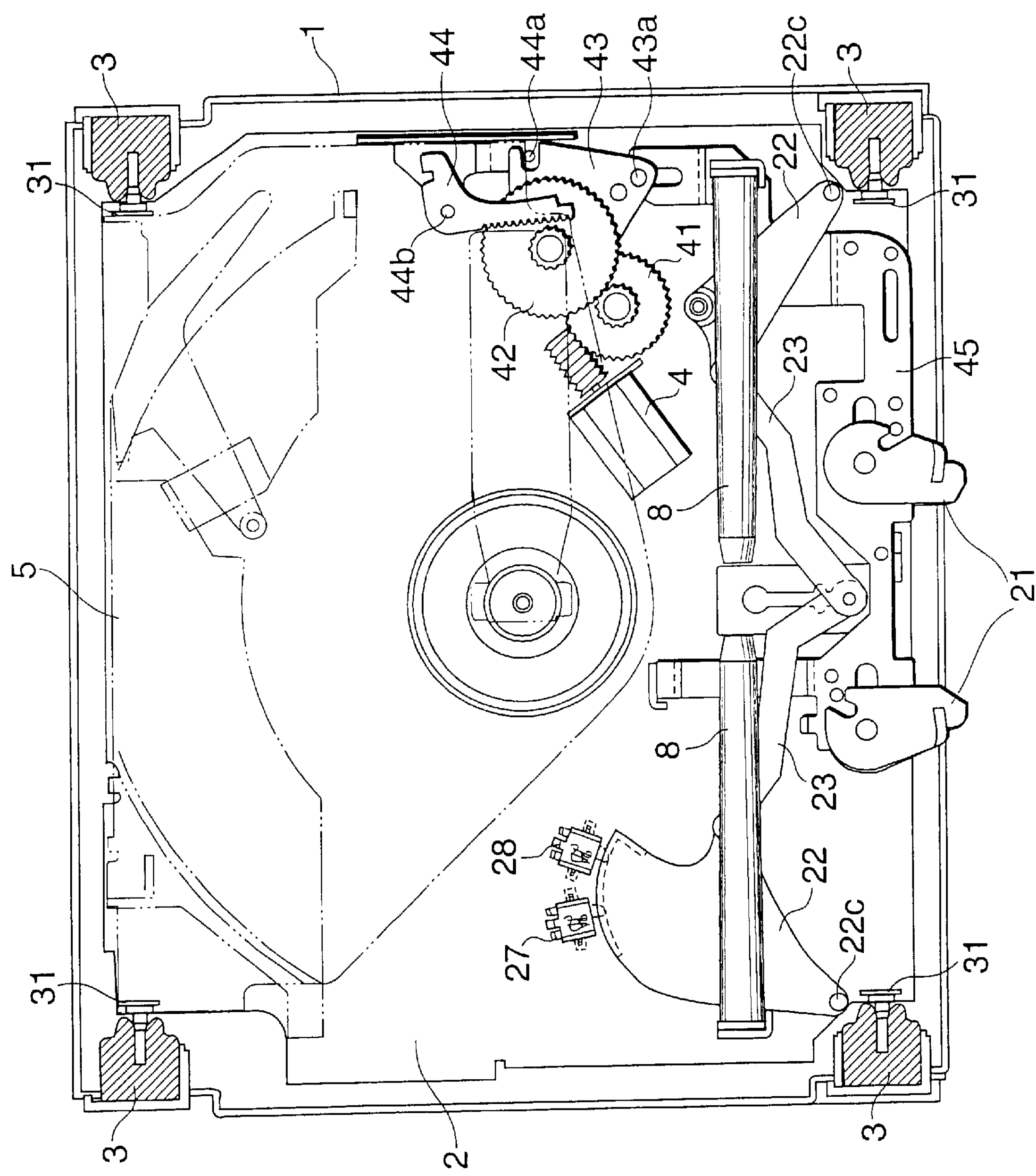
FIG. 3 is a plan view illustrating a recording medium read device according to an embodiment of the present invention.
Figure 4:
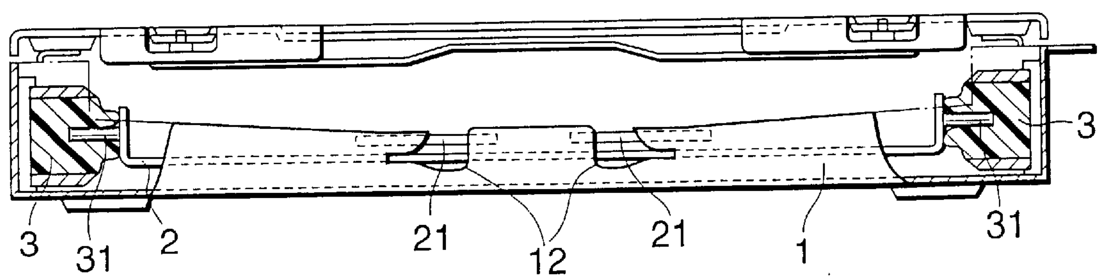
FIG. 4 shows front views illustrating a recording medium read device according to an embodiment of the present invention.
Figure 4:
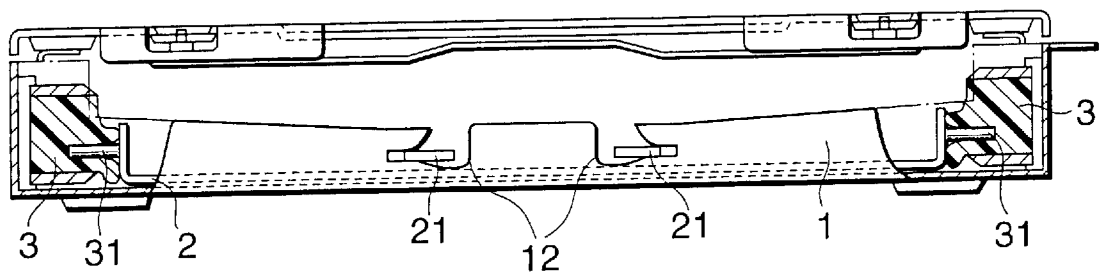

FIG. 1 is a perspective view illustrating the entire recording medium read device according to the present invention. FIG. 2 is a schematic perspective view illustrating the chassis or the main portion of the recording medium read device. FIG. 3 is a plan view illustrating the internal configuration of the device. FIG. 4 shows front views illustrating the device.

Referring to the drawings, reference numeral 1 designates a housing mounted in the switchboard panel with soft lining in a vehicle, and reference numeral 2 designates a chassis suspended in a floated condition via dampers 3 inside the housing 1.

The housing 1 is made up of a frame formed in the shape of a rectangular block and provided on the front thereof with a loading opening 11 for loading a 8 cm or 12 cm CD therein. In addition, there are formed notched portions 12, located immediately below the loading opening 11, for allowing lock arms 21, described later, to fit therein.

The chassis 2 is suspended so as to sustain a floated condition inside the housing 1 via the dampers 3 arranged at four positions or at the right and left of the front and rear portions of the housing 1. The damper 3 is made of elastomer resin and can be elastically deformed or restored. A damper shaft 31, which is connected to the chassis 2, is jointly inserted into the damper 3.

As explained in detail later, the chassis 2 is provided, at the front portion thereof, with a disc transport rollers 8 for transporting each type of CD. A disc guide arm 7 for controlling the angle of transportation of each type of CD is arranged above the disc transport rollers 8. The chassis 2 is also provided, at the rear portion thereof, with clamper arms 6 for clamping each type of CD.

As shown in FIGS. 3 and 4, the lock arms 21 are pivotably arranged at the front portion of the chassis 2 and the tip portion thereof is flush with the upper surface of the notched portions 12. Moreover, the notched portions 12 have an outer portion inclined gradually from the upper to the lower portion with the lower portion allowing the lock arms 21 to fit therein. Rotation of the lock arms 21 allows the tip portion of the lock arms 21 to be guided into the inclined portion while being hooked by the notched portions 12 and then to fit into the notched portions 12 while depressing the chassis 2.

As shown in FIG. 4(*b*), depressing the chassis 2 then causes the damper shafts 31 to move downward and at the same time the dampers 3 to be elastically deformed downward.

Consequently, even if the dampers 3 are interposed in the passage area leading from the loading opening 11 to the read mechanism, the dampers 3 can be elastically deformed to be retreated from the passage area when a recording medium is transported, thus exerting no influence upon the recording medium being transported or passing therethrough.

Furthermore, the chassis 2 is fixed to the housing 1, thereby making it possible to transport a disc without causing the chassis 2 to vibrate during the transportation.

Figure 5:
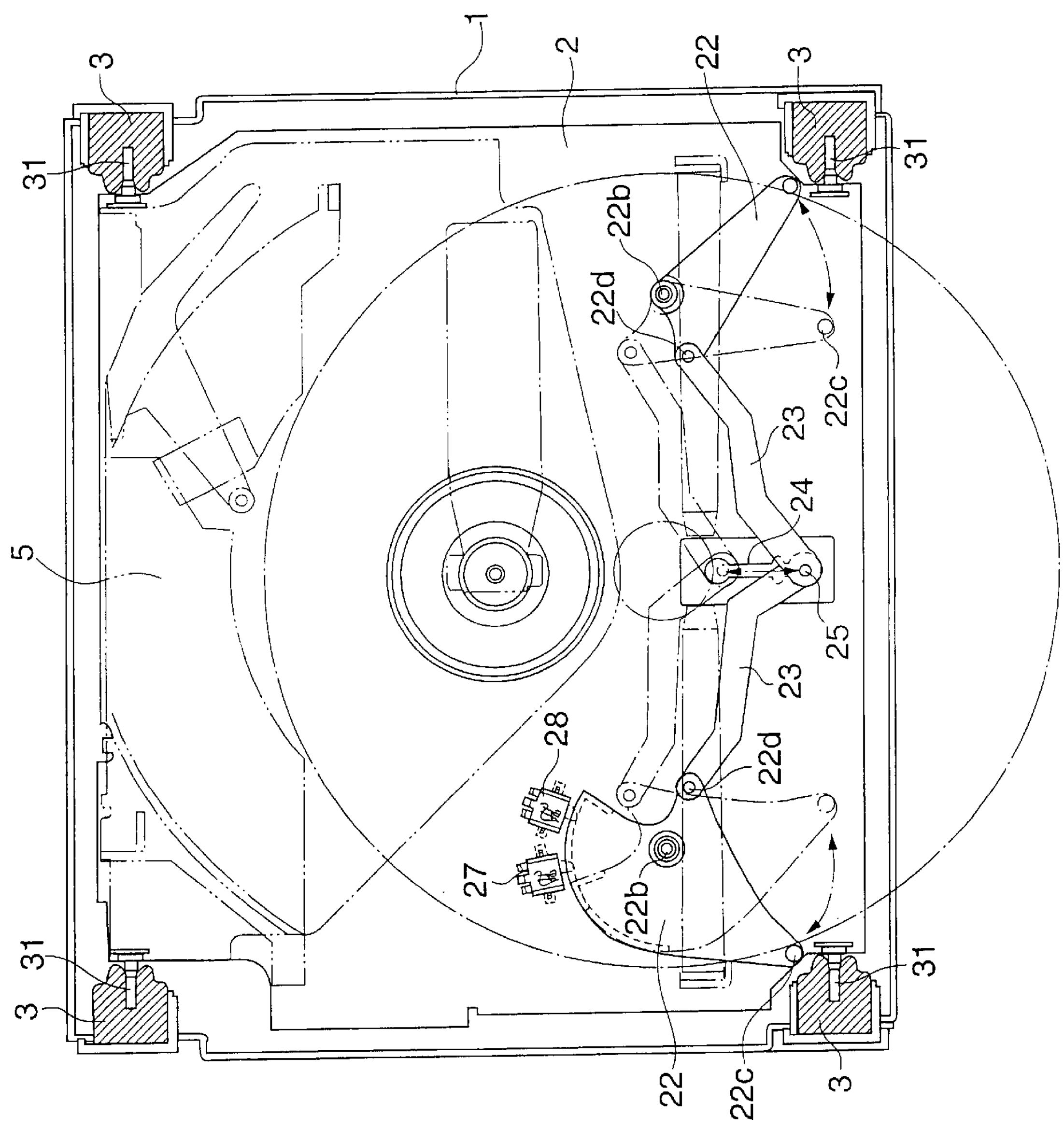
FIG. 5 is an explanatory view illustrating the centering mechanism.

In addition, as shown in FIGS. 2, 3, and 5, the centering mechanism is to position the CD loaded from the loading opening 11 at the center of the loading opening 11. The centering mechanism comprises a pair of centering arms 22, 22 spaced apart from each other by a predetermined distance inside the disc loading opening 11, a pair of joint arms 23, 23 one end of which is each pivotably jointed to the centering arms 22, 22, and a long hole 24 or a guide portion for guiding the other end of joint arms 23, 23 movably in the direction of loading the disc.

As shown in FIG. 2, each of the centering arms 22 is provided with a circular arc cam surface 22*a* arranged in contact with and for turning on or off switches 27, 28 or identification means for identifying the diameter of the disc, as will be described later. Each of the centering arms 22 is pivotally supported on the chassis 2 by means of a support pin 22*b*.

The centering arms 22, 22 are provided on the front end thereof with centering pins 22*c*, 22*c* for being in contact with the rim of the disc loaded. In addition, one ends of the pair of the joint arms 23, 23 are pivotably connected to the rear end of the centering arms 22, 22 by means of pins 22*d*, 22*d*, respectively. Moreover, on the other ends of the joint arms 23, 23, provided is a guide pin 25 for moving along the long hole 24 or the guide portion, with the joint arms 23, 23 being jointed.

As shown in FIG. 2, the long hole 24 has, at the middle portion thereof, a different-diameter hole 24*a* the diameter of which is larger than the shortest width of the long hole 24. The longitudinal direction of the long hole 24 is also oriented as a whole in parallel to the direction of loading the disc. This allows the joint arms 23 to move along the long hole 24 via the guide pin 25 in parallel to the direction of loading the disc.

The guide pin 25 is always energized into the depth of the device by means of a spring 26 one end of which is fixed to the chassis 2.

The centering mechanism configured as such is on standby at the position illustrated by chain lines in FIG. 5 at the normal time such as before a disc is loaded therein.

That is, the spring 26 is energized to narrow the spacing between the centering pins 22*c*, 22*c* via the centering arms 22, 22 and the joint arms 23, 23. The centering pins 22*c*, 22*c* are adapted to have a spacing slightly narrower than the outer diameter of a 8 cm CD at this time.

By the operation of loading a disc, the centering pins 22*c*, 22*c* energize each type of CD in the direction of the center thereof and at the same time rotate the CD in the direction indicated by the arrows of FIG. 5, thereby centering the CD.

Incidentally, the centering pins 22*c*, 22*c* are positioned at the position illustrated in FIG. 3 or 5 only when a 12 cm CD is loaded.

Moreover, suppose that a force is applied only one of the pair of the joint arms 23, 23, that is, a CD is loaded leaning to an either right or left direction to cause a force to be applied to either one of the centering pins 22*c*, 22*c*. This causes the guide pin 25, described later, to go into the different-diameter hole 24*a* and prevented from moving any further.

In addition, at a backward portion of the centering pins 22*c*, 22*c*, provided is the disc guide arm 7. The disc guide arm 7 is arranged above the disc transport rollers 8 to control the angle of transportation of a 8 cm or 12 cm CD transported while being sandwiched with the disc transport rollers 8 and the disc guide arm 7.

Figure 7:
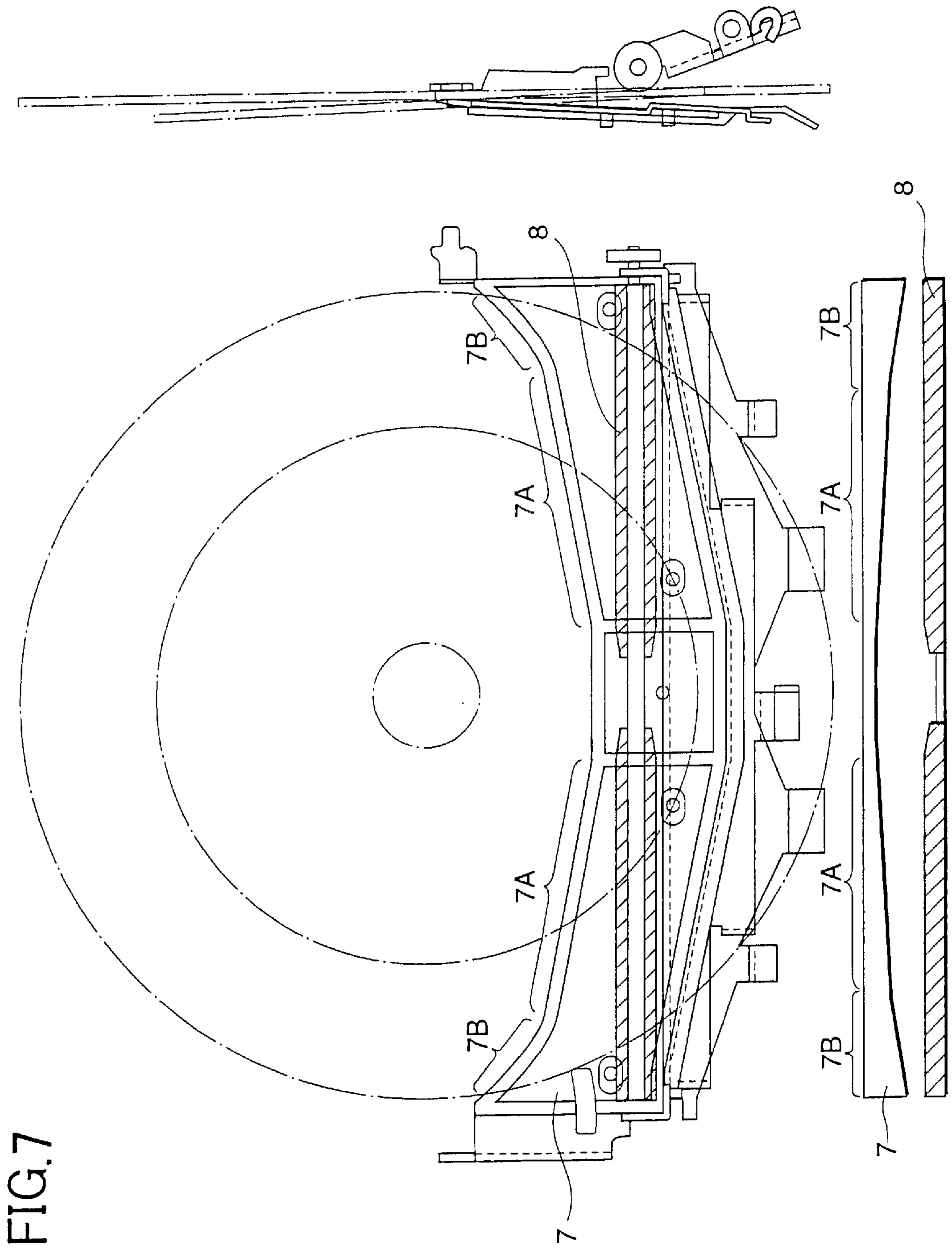
FIG. 7 is an explanatory view illustrating the disc guide arm.

More specifically, the disc guide arm 7 is provided with tapered surfaces 7A, 7B as shown in FIG. 7. The tapered surfaces 7A, 7B are arranged at a portion of the device slightly farther backward from the disc transport rollers 8. A CD loaded from the loading opening 11 is transported by the disc transport rollers 8. At this time, a 8 cm CD passes through the gradually tapered surfaces 7A and a 12 cm CD passes through the sharply tapered surfaces 7B.

Since the 8 cm CD is transported being sandwiched by the disc transport rollers 8 and the tapered surfaces 7A, the angle of transportation thereof is made slightly upward. In contrast, since the 12 cm CD is transported being sandwiched by the disc transport rollers 8 and the tapered surfaces 7B, the angle of transportation thereof is made generally parallel.

Thus, due to the difference in the sharpness of the tapers, the 8 cm CD is oriented, relative to the 12 cm CD, slightly upward to be transported to the read mechanism.

Figure 6:
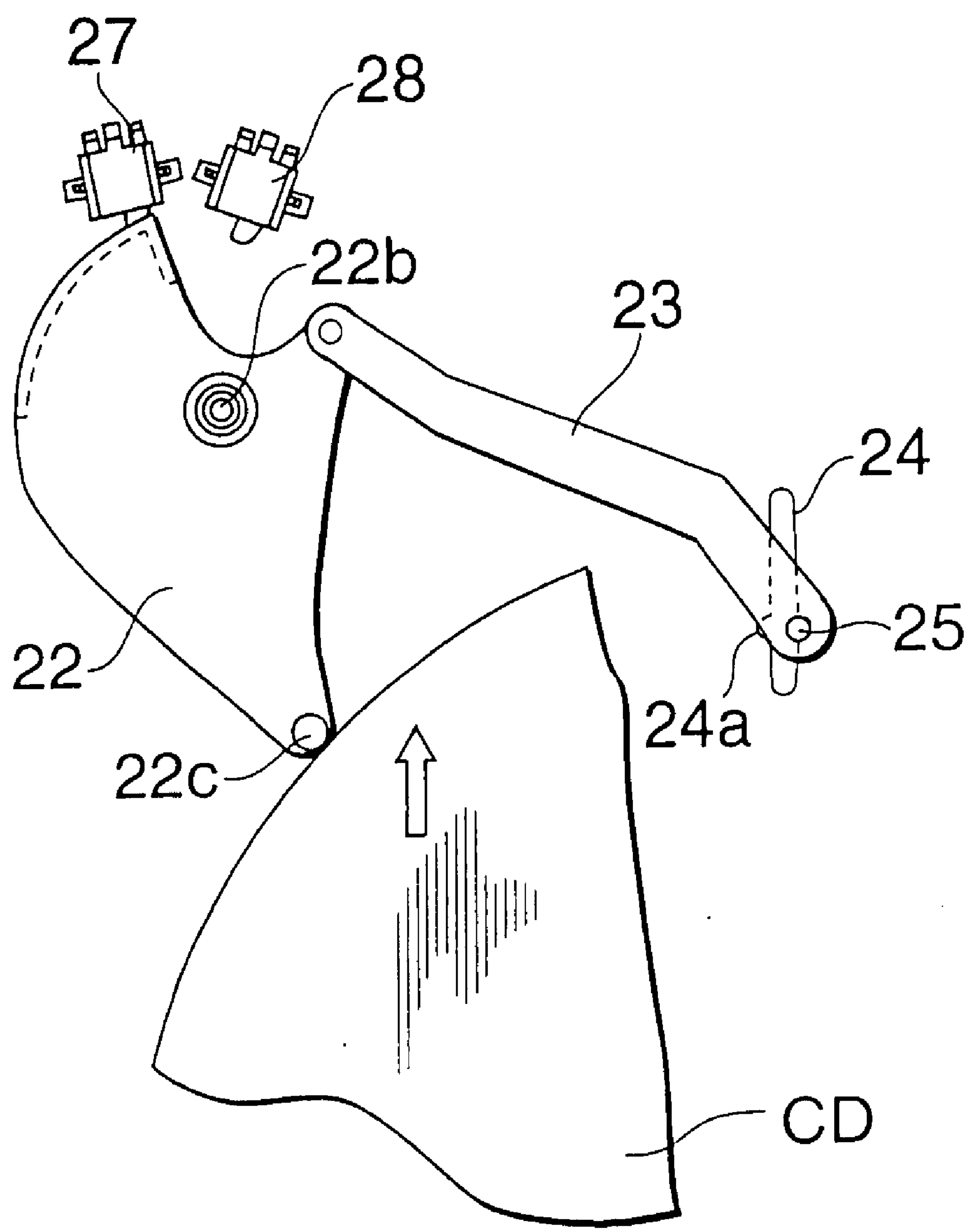
FIG. 6 is an explanatory view illustrating the operation of a centering arm.

Rotation of the centering pins 22*c* causes the centering arms 22, which are integrated with the centering pins 22*c*, to rotate about the support pin 22*b* as shown in FIGS. 2 and 6.

When the 8 cm CD is loaded, the centering pins 22*c* rotate less to cause the centering arms 22 to rotate less. Thus, the cam surface 22*a* formed on each of the centering arms 22 is brought into contact only with the switch 27, thus turning on only the switch 27. Then, it is determined that the loaded CD is the 8 cm CD.

When the 12 cm CD is loaded, the centering pins 22*c* rotate greatly. Thus, the cam surface 22*a* formed on each of the centering arms 22 is brought into contact with the switches 27, 28, thus turning on both the switches. Then, the loaded CD is determined to be the 12 cm CD from the fact that both the switches 27, 28 have been turned on.

Next, the configuration of the positioning means for positioning each type of CD disc is explained.

Figure 8:
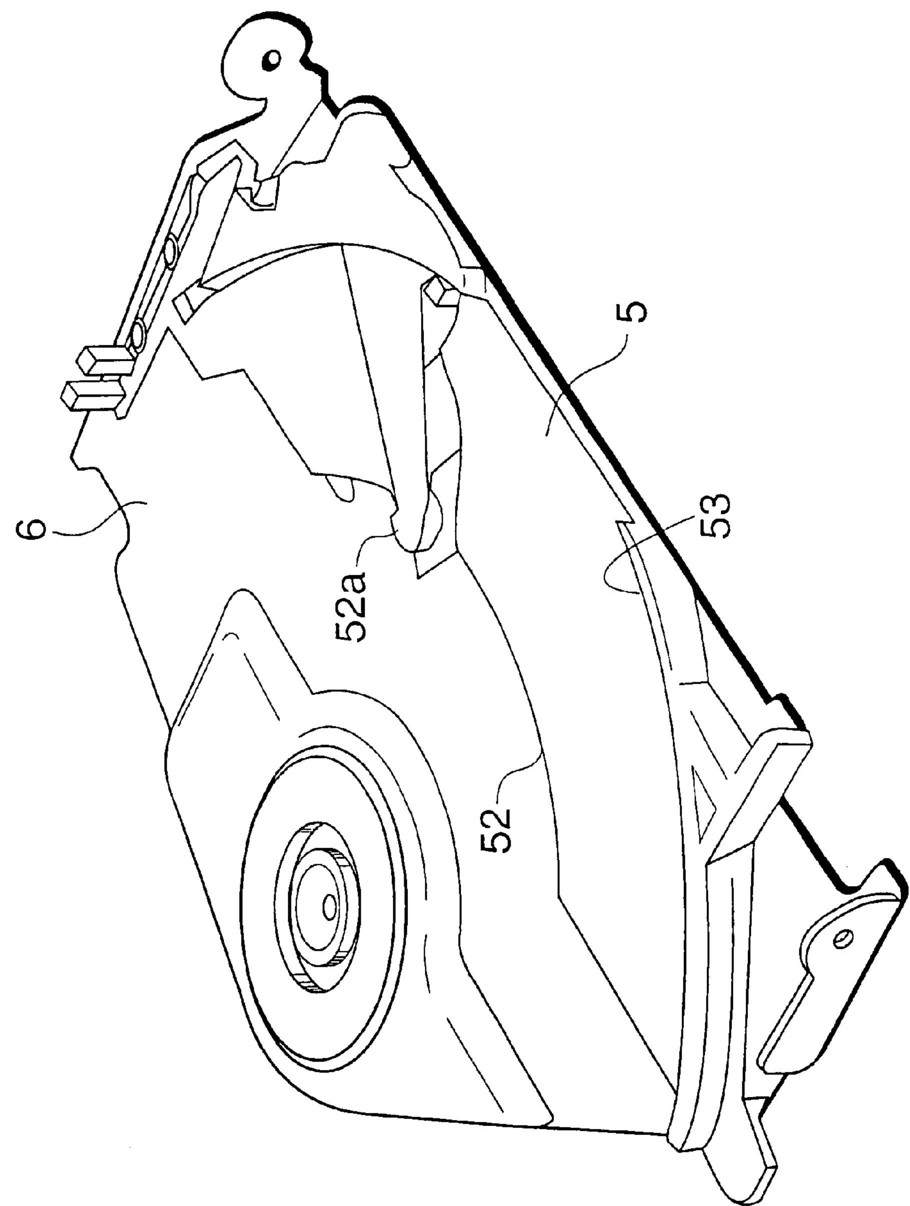
FIG. 8 is a perspective view illustrating the centering disc guide arm.
Figure 9:
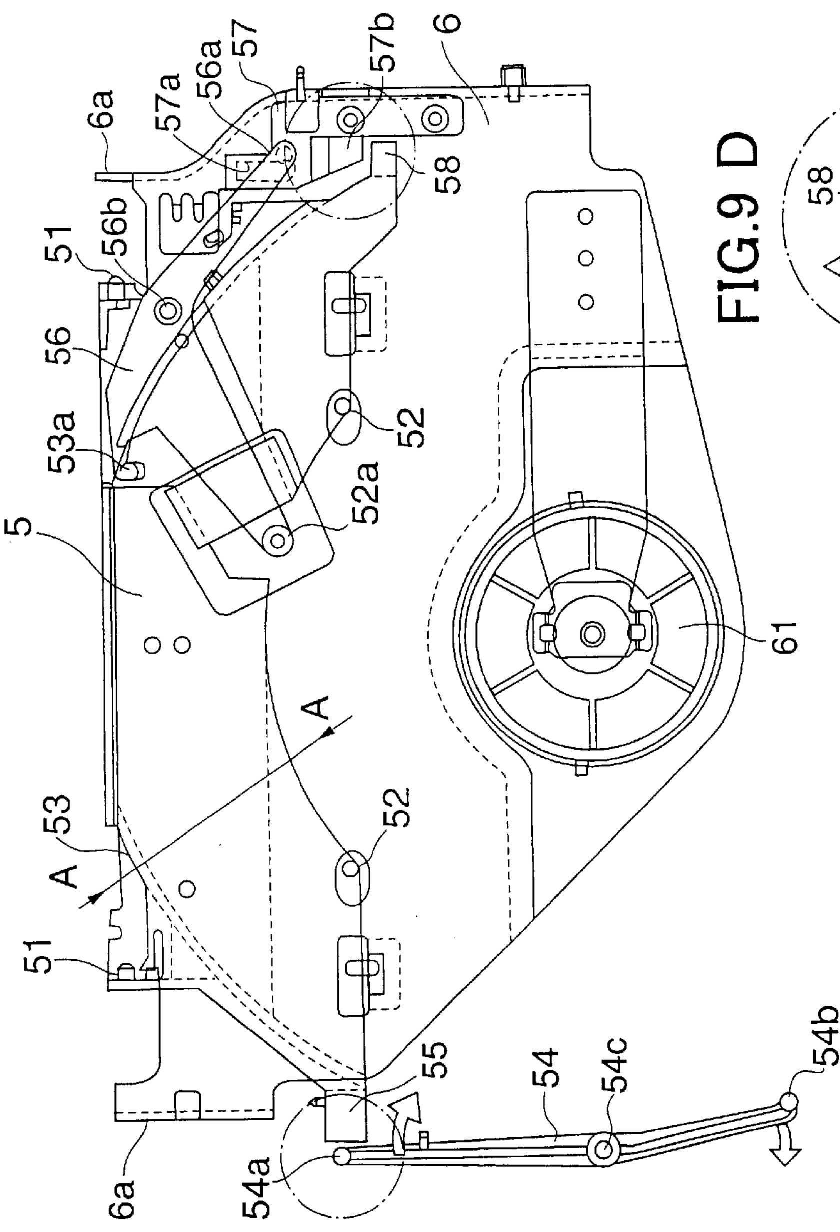
FIG. 9 is a plan view illustrating the centering disc guide arm.
Figure 9:
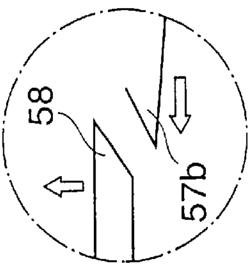
Figure 9:
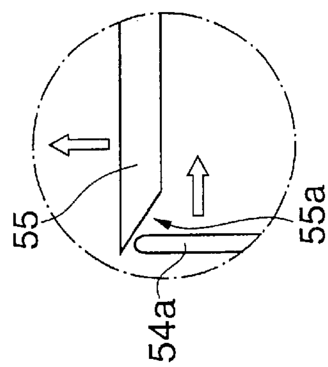
Figure 9:
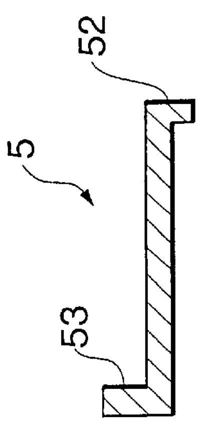

FIG. 8 is a perspective view illustrating the positioning means for positioning a disc, when viewed from the bottom thereof. FIG. 9 is a plan view illustrating the positioning means.

As shown in FIGS. 8 and 9, reference numeral 5 designates the positioning means or a centering guide arm, a member for centering a disc to be transported.

Moreover, reference numeral 6 designates a clamper arm or support means, which is tiltably attached to the chassis 2 shown in FIG. 1 via fixture pieces 6*a*.

Generally at the center of the clamper arm 6, arranged is a clamper 61 for clamping the center of the disc to the spindle motor of the read mechanism.

The centering guide arm 5 is journaled by axes 51, 51 at the rear portion of the clamper arm 6, thereby being tiltably arranged.

The centering guide arm 5 is formed of a plastic plate thicker in thickness at least than the CD.

Figure 10:
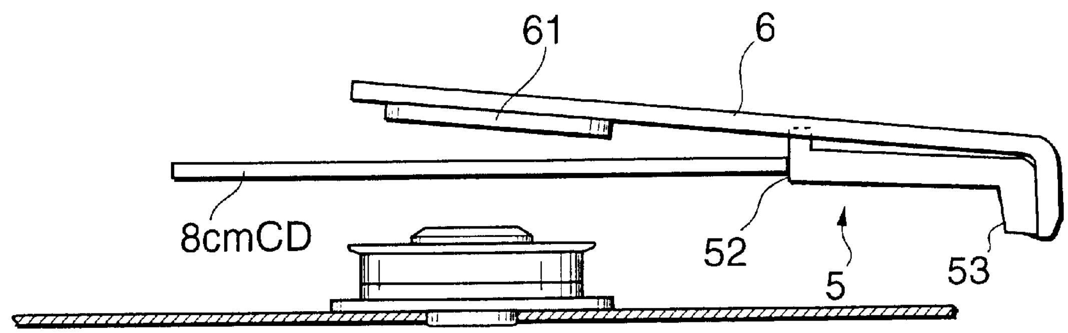
FIG. 10 is an explanatory view illustrating an 8 cm CD being in contact with a positioning portion.

Inside the centering guide arm 5, formed are first positioning portions 52. That is, the first positioning portions 52 are formed in the shape of a circular arc so as to match the outer circumference of the 8 cm CD. As shown in FIG. 10, the outer rim of the 8 cm CD transported is brought into contact with the first positioning portions 52 and the 8 cm CD is thereby positioned in place relative to the read mechanism. That is, the disc is positioned at a position where the center of the disc coincides with the center of the turntable and the disc can be clamped.

Figure 11:
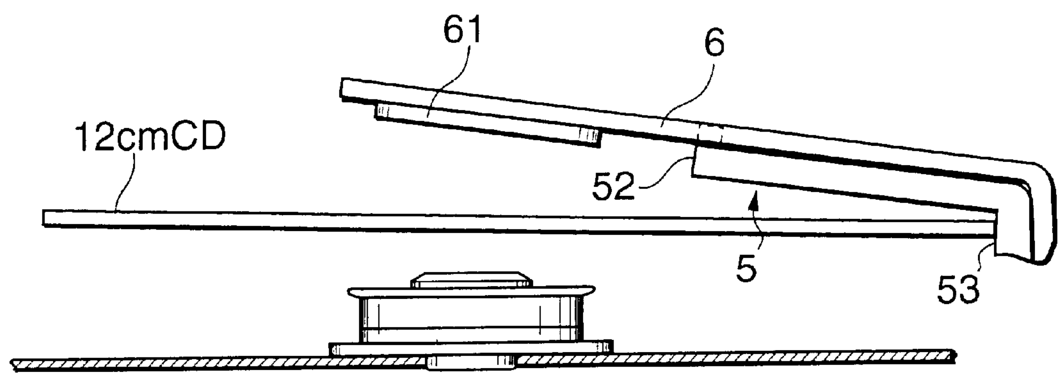
FIG. 11 is an explanatory view illustrating an 12 cm CD being in contact with a positioning portion.

In addition, outside the centering guide arm 5, formed is a second positioning portion 53 as shown in FIG. 9(*c*), a cross section taken along line A—A of FIGS. 8 and 9(*a*). The second positioning portion 53 has a stepped outer circumference portion of the centering guide arm 5, formed in the shape of a circular arc to match the outer circumference of the 12 cm CD. As shown in FIG. 11, the outer rim of the 12 cm CD transported is brought into contact with the second positioning portion 53 or the stepped portion, and the 12 cm CD is thereby positioned in place relative to the read mechanism. For example, the CD is positioned at a position where the center of the disc coincides with the center of the turntable and the disc can be clamped.

In addition, the centering guide arm 5 is always energized to incline downward relative to the clamper arm 6, with the first positioning portions 52 for the 8 cm CD being protruded into the disc transportation passage. Thus, as shown in FIG. 10, a CD transported is positioned, with the outer rim thereof being brought into contact with the first positioning portions 52.

Next, the inclination of the centering guide arm 5 is explained.

A guide retreat arm 54 shown in FIG. 9(*a*) is rotatably arranged by means of a support pin 54*c* on one side of the chassis 2. The guide retreat arm 54 is provided on the front end thereof with a contact portion 54*b* for contacting with the 12 cm CD transported and with an arm pin 54*a* on the rear end. On the other hand, as shown in FIG. 9(*b*), provided is a tapered surface 55*a* on an extending portion 55 arranged on a side of the centering guide arm 5.

Thus, when the 12 cm CD is transported, the outer rim of the CD is brought into contact with the contact portion 54*b* of the guide retreat arm 54, causing the guide retreat arm 54 to rotate about the support pin 54*c*. Then, the arm pin 54*a* at the rear end is brought into contact with the tapered surface 55*a* and then lifts up the centering guide arm 5 to be in parallel to the damper arm 6. Consequently, this causes the first positioning portions 52 protruded into the transport passage of CD to retreat upward, thus providing a transport passage for the 12 cm CD. The 12 cm CD transported is brought into contact with the second positioning portion 53 to be positioned on the read mechanism.

Moreover, the 8 cm CD is transported while being centered to the center of the device by means of the centering pins 22*c*. Since the 8 cm CD is smaller in the outer diameter than the 12 cm CD, the 8 cm CD will never be brought into contact with the contact portion 54*b*.

In addition, as another example, the centering pins 22*c* can be adapted to serve also as the contact portion 54*b*. To implement this example, the front end of the guide retreat arm 54 is extended so that the contact portion 54*b* is positioned at the normal position of the centering pins 22*c*, which is not illustrated specifically.

Then, for example, the arm pin 54*a* provided on the rear end of the guide retreat arm 54 is spaced apart from the tapered surface 55*a* of the centering guide arm 5. Thus, when the 8 cm CD is transported, the arm pin 54*a* is not brought into contact with the tapered surface 55*a*, but the arm pin 54*a* is adapted to contact with the tapered surface 55*a* only when the 12 cm CD is transported.

That is, when the 8 cm CD is transported, the centering pins 22*c* rotate a little but insufficiently to cause the arm pin 54*a* to contact with the tapered surface 55*a*. The arm pin 54*a* is adapted to contact with the tapered surface 55*a* to push the centering guide arm 5 upward only when the 12 cm CD is transported to cause the centering pins 22*c* to rotate a great deal.

In addition, it was so explained in the foregoing that the centering guide arm 5 was tiltably arranged and journaled with the axes 51, 51 at the rear portion of the clamper arm 6. However, the present invention is not limited thereto but the centering guide arm 5 may be moved by any other method. For example, with the entire centering guide arm 5 being suspended with an elastic body, the first positioning portions 52 for the 8 cm CD may be usually kept projected in the disc transport passage. The entire centering guide arm 5 may be adapted to be lifted up to allow the second positioning portion 53 to be positioned in the transport passage when the 12 cm CD is transported.

In addition, the first positioning portions 52 and the second positioning portion 53 of the centering guide arm 5 are provided with first and second detector members or detector means for each detecting that the disc has been positioned.

As shown in FIG. 9, these detector members include a detector arm 56 one side of which is bifurcated, and a first detector member or a detector pin 52*a* and a second detector member or a detector pin 53*a*, each being formed on the bifurcated end portions of the detector arm 56.

In addition, the detector arm 56 is arranged such that the detector pin 52*a* is slightly projected from the first positioning portions 52 and the detector pin 53*a* is projected slightly from the second positioning portion 53, being pivotably journaled on the centering guide arm 5 by means of a pin 56*b*. When the 8 cm CD or the 12 cm CD is transported and the outer rim of the CD is brought into contact with the detector pin 52*a* or the detector pin 53*a*, the detector arm 56 is rotated slightly. As explained in detail later, the centering guide arm 5 is tilted upward and the detector arm 56 is put apart from the CD, thus making it possible to clamp the CD.

Figure 12:
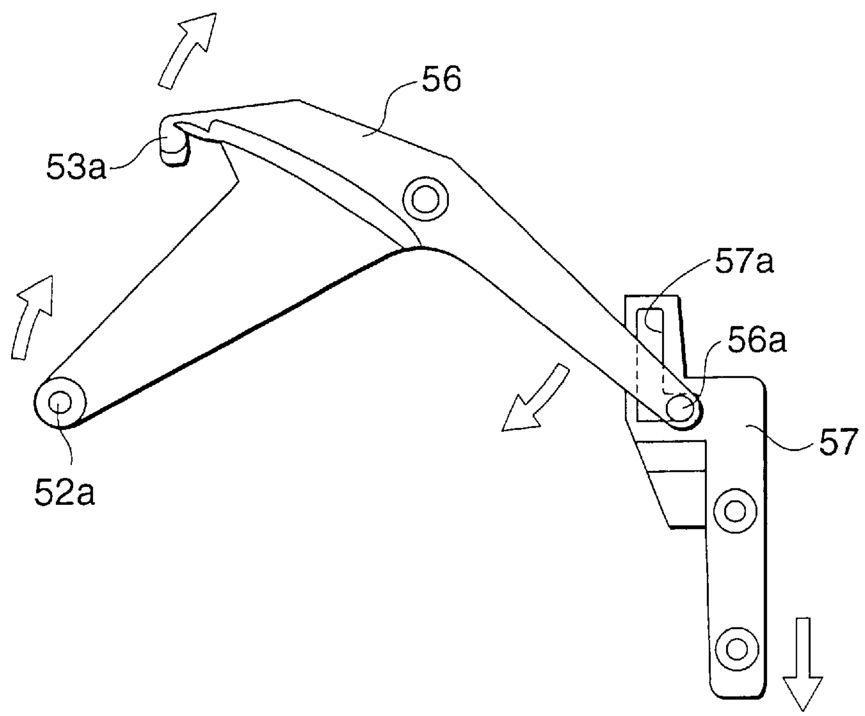
FIG. 12 shows explanatory views illustrating the operation of a detector arm and a joint member.
Figure 12:
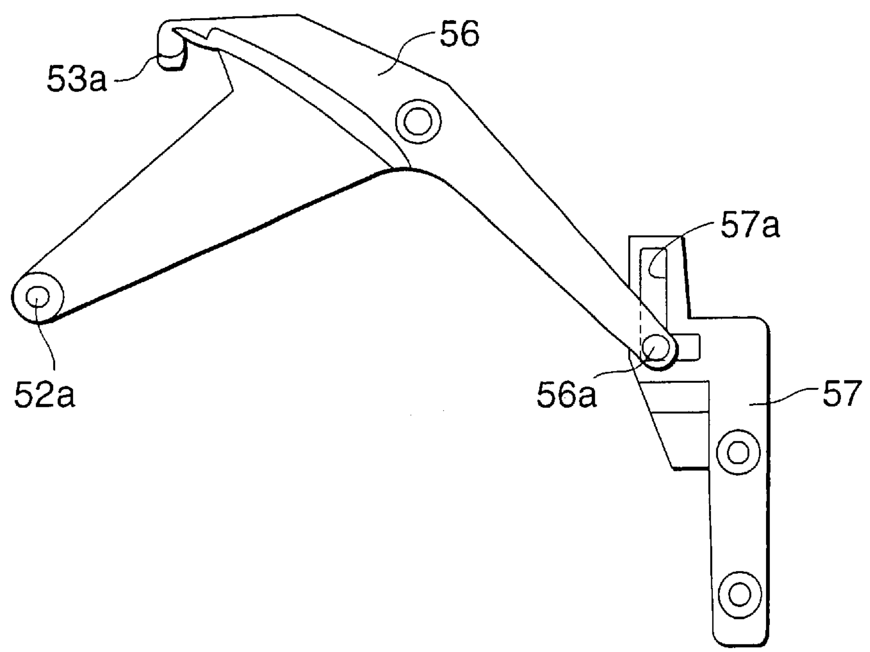

In addition, as shown in FIG. 12, a detector arm pin 56*a* is formed on the other side of the detector arm 56 and is fitted into an L-shaped long hole 57*a* formed on one side of a joint member 57 or a transmission member.

The joint member 57 is arranged slidably in the back and forth direction of the device (in the vertical direction in the figure) on a side of the clamper arm 6. When a CD is not loaded, the detector arm pin 56*a* is positioned in the short hole portion of the L-shaped long hole as shown in FIG. 12(*a*).

When a CD is transported and the outer rim of the CD is brought into contact with the detector pin 52*a* or the detector pin 53*a* to cause the CD to be positioned at the positioning members 52 or positioning member 53, the detector arm 56 is rotated a little. Then, the detector arm pin 56*a* is displaced to the position shown in FIG. 12(*b*), while depressing the joint member 57.

Figure 13:
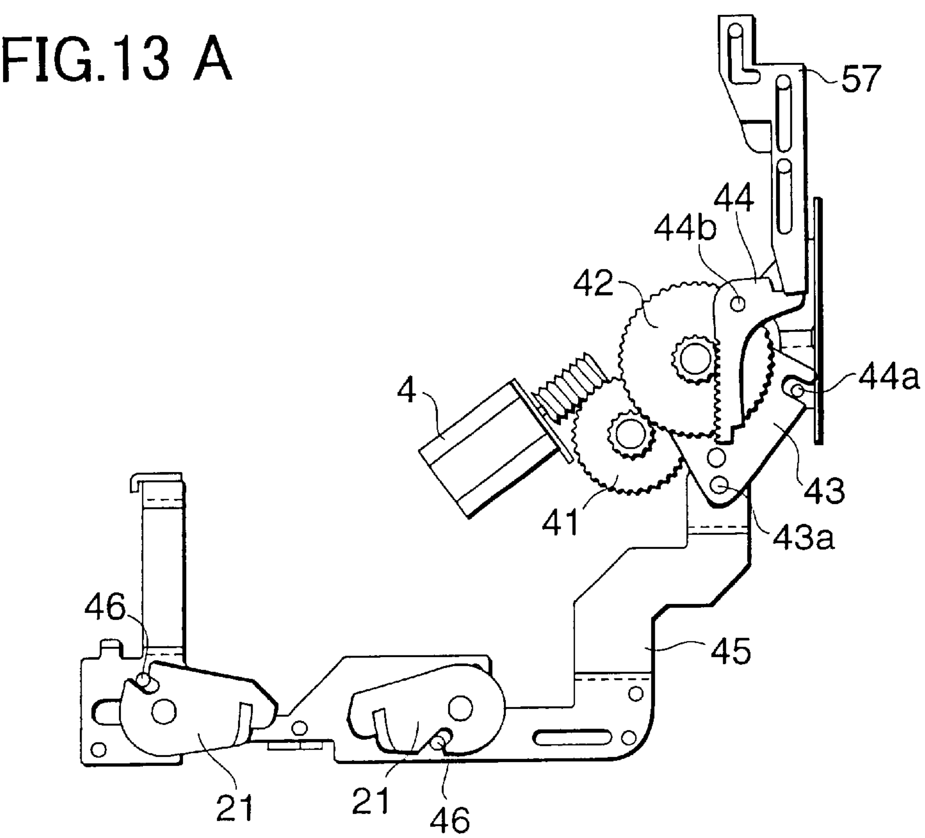
FIG. 13 is an explanatory view illustrating power transmission.
Figure 13:
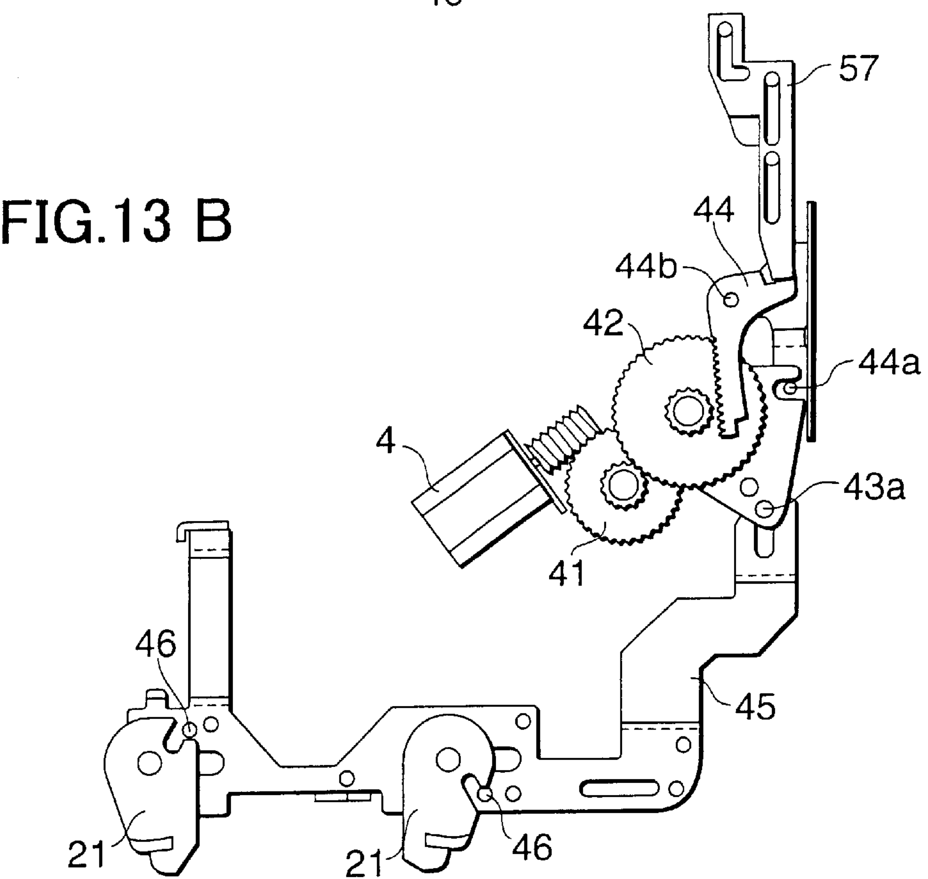
Figure 14:
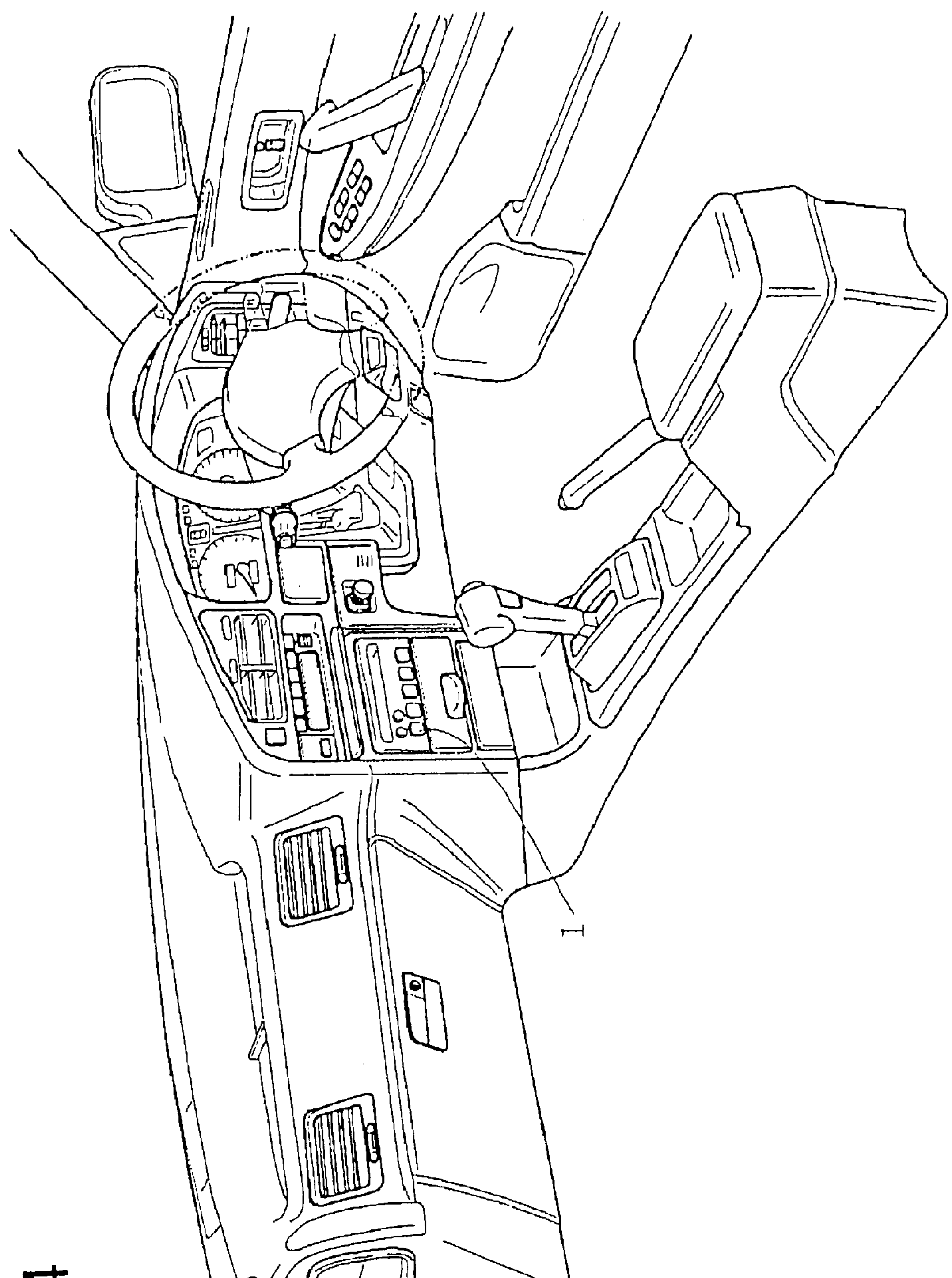
FIG. 14 is an explanatory view illustrating a recording medium read device mounted in a vehicle.

Next, as shown in FIG. 13, a rack 44 is pivotably connected to the lower end of the joint member 57. In addition, a shaft 44*b* makes the rack 44 pivotable. Moreover, the chassis 2 is provided with a motor 4 which is engaged with a gear 41, the gear 41 being in turn engaged with a gear 42. The gear 41 and the gear 42 are adapted to attenuate the number of revolutions of the motor 4.

With each of the members to be engaged with each other as described above, depressing the joint member 57 causes the rack 44, which is connected pivotably to the other end of the joint member 57, to engage the gear 42 and causes the rack 44 to be depressed as well. Thus, the joint member 57 is further depressed, so that, as shown in FIG. 9(*d*), a tapered surface 57*b* formed on the joint member 57 and a tapered portion 58 formed on the centering guide arm 5 are brought into contact with each other to push the centering guide arm 5 upward, thereby causing the centering guide arm 5 to be put apart away from the CD.

In addition, as shown in FIGS. 10 and 11, when the CD is positioned, a rack pin 44*a* formed integrally with the rack 44 is depressed to cause a cam 43, which is engaged with the rack pin 44*a*, to rotate. Furthermore, a lock lever 45 which fits to a cam pin 43*a* formed integrally with the cam 43 moves slidingly in the lateral direction (to the left in the figure). In addition, a lock arm pin 46 erected on the lock lever 45 pushes the lock arms 21, 21 to cause each of the lock arms 21, 21 to rotate inwardly. Consequently, the lock arms 21, 21 are disengaged from the notched portions 12 to cause the chassis 2 to be suspended in a floated condition.

In addition, a clamp mechanism and a disc transport roller retreat mechanism, which are not shown, are also adapted to be powered by the motor 4 when the joint member 57 is moved.

Accordingly, the clamp mechanism clamps each type of CD which has been positioned, while the disc transport roller retreat mechanism retreats the disc transport rollers 8 from the disc surface so as to release the contact between the disc and the rollers. Thus, the CD is ready for reading.

As described above, the contact between the positioning portions 52, 53, detector pins 52*a*, 53*a*, and the CD is released by the movement of the centering guide arm 5. The contact between the disc transport rollers 8 and the CD is released by the retreat movement of the disc transport rollers 8. The CD can thereby be read appropriately.

Now, explained below will be the operation of the recording medium read device according to the present invention configured as described above.

First, the process of transporting the 8 cm CD is explained.

When the 8 cm CD is loaded into the device from the loading opening 11, the CD comes into contact with either right or left centering pin 22*c* as shown in FIG. 5. The centering pin 22*c* is pushed by the disc to rotate, and at the same time this action causes the guide pin 25 to move downwardly along the long hole 24 via the joint arm 23. Then, the rotation of the centering pin 22*c* causes the cam surface 22*a* of the centering arm 22 to come into contact with and then turn on the switch 27. The turning on the switch 27 causes the disc transport rollers 8 to start rotating and the CD to start being transported.

The transported CD is sandwiched by means of the disc transport rollers 8 and the disc guide arm 7 and transported into the device. At this time, the 8 cm CD is oriented slightly upward to be transported to the read mechanism by means of the disc guide arm 7 shaped as shown in FIG. 7.

In addition, the centering arm 22 is rotated further in the transport process, however, the arm returns to the original position thereof after the maximum diameter portion of the 8 cm CD has come into contact with the centering pin 22*c*.

At this time, suppose that the 8 cm CD is loaded leaning to either side of the loading opening 11, for example, the disc is loaded diagonally relative to the loading opening 11 to come into contact only with the left centering pin 22*c* as shown in FIG. 6. In this case, after the centering arm 22 has rotated to some extent, the guide pin 25 goes into the hole 24*a* of the long hole 24 to prevent the guide pin 25 from moving further to cause the centering pin 22*c* to be locked. This causes the 8 cm CD to move to the center of the device and is thus centered. Incidentally, this centering action does not cause the 8 cm CD to come into contact with the contact portion 54*b* of the guide retreat arm 54.

Then, the 8 cm CD transported to the read mechanism comes into contact with the first positioning portions 52 of the centering guide arm 5 to be centered and positioned on the read mechanism. At this time, the 8 cm CD is transported being slightly inclined upward and thus brought accurately into contact with the first positioning portions 52.

Then, the outer rim of the 8 cm CD is brought into contact with the detector pin 52*a* to cause the detector arm 56 to rotate. Then, the rotation of the detector arm 56 causes the joint member 57 to move and the centering guide arm 5 to move apart from the outer rim of the CD.

Incidentally, the lock arms 21 are unlocked as described above in accordance with the movement of the joint member 57 and the chassis 2 (the read mechanism) is driven into a floated condition.

At the same time, in accordance with the movement of the joint member 57, the disc transport rollers 8 are retreated from the recording surface of the 8 cm CD and thereafter the clamp mechanism is activated. Then, after the clamping has been completed, the read operation is started.

Incidentally, the switch 28 is configured so as not to be turned on in the transport process of 8 cm CD. Accordingly, if the switch 28 has not been turned on when the 8 cm CD has been transported, the disc loaded can be identified to be the 8 cm CD.

Next, the 12 cm CD is explained.

When the 12 cm CD is loaded into the device through the loading opening 11, the disc comes into contact, for example, with either right or left centering pin 22*c* as shown in FIG. 5. The centering pin 22*c* is pushed and thereby rotated by the disc, thereby causing the guide pin 25 to move along the long hole 24 via the joint arm 23. Then, the rotation of the centering pin 22*c* causes the cam surface 22*a* of the centering arm 22 to come into contact with the switch 27 and the switch 28 to turn on the switches 27, 28. Then, the turning on the switch 27 causes the disc transport rollers 8 to start rotating and the CD to start being transported.

The transported CD is sandwiched by means of the disc transport rollers 8 and the disc guide arm 7 and transported into the deep portion of the device. At this time, the 12 cm CD is oriented generally in parallel to be transported onto the read mechanism by means of the disc guide arm 7 shaped as shown in FIG. 7.

In addition, the centering arm 22 is rotated further in the transport process, however, the arm returns to the original position thereof after the maximum diameter portion of the 12 cm CD has come into contact with the centering pin 22*c*.

On the other hand, in the course of the transportation, the outer rim of the 12 cm CD comes into contact with the contact portion 54*b* of the guide retreat arm 54 to cause the guide retreat arm 54 to rotate about the support pin 54*c* to lift up the centering guide arm 5 and is thus made parallel to the clamper arm 6.

Consequently, the first positioning portions 52 which have been protruded into the transport passage for the 12 cm CD are retreated upward, thus ensuring the transport passage for the 12 cm CD. Then, the second positioning portion 53 comes into the transport passage for the 12 cm CD.

Then, the 12 cm CD transported to the read mechanism comes into contact with the second positioning portion 53 of the centering guide arm 5 to be centered and positioned on the read mechanism.

Then, the outer rim of the 12 cm CD is brought into contact with the detector pin 53*a* to cause the detector arm 56 to rotate. Then, the rotation of the detector arm 56 causes the joint member 57 to move and the centering guide arm 5 to move apart from the outer rim of the CD as described above.

Incidentally, the lock arms 21 are unlocked as described above in accordance with the movement of the joint member 57 and the read mechanism mounted on the chassis 2 is driven into a floated condition.

At the same time, in accordance with the movement of the joint member 57, the disc transport rollers 8 are retreated from the recording surface of the 12 cm CD and thereafter the clamp mechanism is activated. Then, after the clamping has been completed, the read operation is started.

Incidentally, the switch 28 is configured so as to be turned on in the transport process of 12 cm CD. Accordingly, if the switch 28 has not been turned on when the 12 cm CD has been transported, the disc loaded can be identified to be the 12 cm CD. Next, the process of ejecting each type of disc will be explained.

When an eject button (not shown) is depressed, each type of 8 cm CD or 12 cm CD is ejected from the loading opening 11 by the action opposite to the aforementioned transport process.

Incidentally, for the 8 cm CD, when the switch 27 has been turned off, the disc transport rollers 8 stop being driven and the 8 cm CD is sandwiched by means of the disc transport rollers 8 and the disc guide arm 7 with part of the disc being protruded from the loading opening 11.

In addition, for the 12 cm CD, when the switch 28 has been turned off, the disc transport rollers 8 stop being driven and the 12 cm CD is sandwiched by means of the disc transport rollers 8 and the disc guide arm 7 with part of the disc being protruded from the loading opening 11.

As described above, the recording medium read device according to the present invention can positively position each of the 8 cm CD and 12 cm CD by means of the centering guide arm 5 having the first positioning portions 52 and the second positioning portion 53 formed thereon. In addition, it can be positively detected by means of the detector pins 52*a*, 53*a* that the CD has been positioned at the read mechanism.

Furthermore, slight movement of the centering guide arm 5 allows the positioning portions and the detector pins for each type of disc to be formed on the same member, thereby reducing the device in size and the number of parts.

Incidentally, such an embodiment has been explained that employs CDs as the recording medium, however, the present invention is not limited thereto. Other disc-shaped recording medium such as DVDs may be employed.

In addition, the aforementioned CDs are 8 cm and 12 cm in the outer diameter, however, the present invention is not limited thereto. Discs having other outer diameter may also be employed.

As described above, according to the present invention, a recording medium of a smaller or larger diameter transported into the read device can be positioned with accuracy on the read mechanism, and it can be detected with accuracy that the medium has been positioned.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A recording medium read device having a loading opening for allowing a recording medium of a smaller and a larger diameter to be loaded therethrough and a read mechanism for reading said recording medium, said device comprising:

positioning means for positioning said recording medium loaded into said loading opening to a predetermined position relative to said read mechanism, wherein:

said positioning means has a first positioning portion for positioning a recording medium of said smaller diameter and a second positioning portion for positioning a recording medium of said larger diameter in one member; and when a recording medium of said larger diameter is transported, said first positioning portion is retreated from a transport passage for the recording medium of said larger diameter, and wherein:

when the medium of the smaller diameter is loaded in the device, said medium of the smaller diameter contacts said first positioning portion and does not contact said second positioning portion; and when the medium of the larger diameter is loaded in the device, said medium of the larger diameter contacts said second positioning portion and does not contact said first positioning portion.

2. The recording medium read device according to claim 1, wherein said positioning means is movable so that said first positioning portion is retreated in a direction generally perpendicular to a recording surface of the recording medium being transported.

3. The recording medium read device according to claim 1, wherein said second positioning portion is located at a position for positioning the recording medium of said larger diameter after said first positioning portion has been retreated.

4. The recording medium read device according to claim 1, wherein said positioning means is disposed in a deep portion of the device and are pivotably tilted about a shaft generally parallel to the recording surface of the recording medium.

5. The recording medium read device according to claim 2 or 4, wherein said positioning means can be moved by a transport force of the recording medium of said larger diameter.

6. The recording medium read device according to claim 1, further comprising a contact member for contacting with a rim of the recording medium of said larger diameter, wherein said contact member moves to allow said positioning means to move.

7. A recording medium read device having a loading opening for allowing a recording medium of a smaller and a larger diameter to be loaded therethrough and a read mechanism for reading said recording medium, said device comprising:

detector means for detecting that said recording medium loaded into said loading opening has been positioned to a predetermined position relative to said read mechanism, wherein said detector means is bifurcated and has a first detector member on a first bifurcated end portion of said detector means for contacting a rim of the recording medium of said smaller diameter and a second detector member on a second bifurcated end portion of said detector means for contacting a rim of the recording medium of said larger diameter, and is pivotably tilted about a shaft generally parallel to the recording surface of the recording medium, and when the recording medium of said larger diameter is transported, said first detector member is retreated from a transport passage for the recording medium of said larger diameter, and wherein said detector means is movable so that said first detector member is retreated in a direction generally perpendicular to a recording surface of the recording medium being transported when said detector means is pivotably tilted about the shaft.

8. The recording medium read device according to claim 7, wherein said second detector member is located at a position for positioning the recording medium of said larger diameter after said first detector member has been retreated.

9. The recording medium read device according to claim 7, wherein said detector means is disposed in a deep portion of the device.

10. The recording medium read device according to claim 7, further comprising positioning means having a first positioning portion for positioning the recording medium of said smaller diameter and a second positioning portion for positioning the recording medium of said larger diameter in one member, wherein said first detector member is provided by being slightly protruded from said first positioning portion and said second detector member is provided by being slightly protruded from said second positioning portion.

11. The recording medium read device according to claim 10, wherein said detector members and said positioning means is provided on the same support means.

12. The recording medium read device according to claim 11, further comprising a transmission member for moving a predetermined distance by rotation of said detector arm, wherein said transmission member moves to cause said support member to move in a direction to disengage said positioning means from said recording medium.

13. The recording medium read device according to claim 7, wherein said detector means is a detector arm, said first detector member and said second detector member being formed on the same detector arm, and said detector arm is pivotably journaled.

14. A recording medium read device having a loading opening for allowing a recording medium of a smaller and a larger diameter to be loaded therethrough and a read mechanism for reading said recording medium, said device comprising:

a positioning unit for positioning said recording medium loaded into said loading opening to a predetermined position relative to said read mechanism, wherein:

said positioning unit has a first positioning portion for positioning a recording medium of said smaller diameter and a second positioning portion for positioning a recording medium of said larger diameter in one member; and when a recording medium of said larger diameter is transported, said first positioning portion is retreated from a transport passage for the recording medium of said larger diameter, and wherein:

when the medium of the smaller diameter is loaded in the device, said medium of the smaller diameter contacts said first positioning portion and does not contact said second positioning portion; and when the medium of the larger diameter is loaded in the device, said medium of the larger diameter contacts said second positioning portion and does not contact said first positioning portion.

15. A recording medium read device having a loading opening for allowing a recording medium of a smaller and a larger diameter to be loaded therethrough and a read mechanism for reading said recording medium, said device comprising:

a detector for detecting that said recording medium loaded into said loading opening has been positioned to a predetermined position relative to said read mechanism, wherein said detector is bifurcated and has a first detector member on a first bifurcated end portion of said detector for contacting a rim of the recording medium of said smaller diameter and a second detector member on a second bifurcated end portion of said detector for contacting a rim of the recording medium of said larger diameter, and is pivotably tilted about a shaft generally parallel to the recording surface of the recording medium, and when the recording medium of said larger diameter is transported, said first detector member is retreated from a transport passage for the recording medium of said larger diameter, and wherein said detector is movable so that said first detector member is retreated in a direction generally perpendicular to a recording surface of the recording medium being transported when said detector is pivotably tilted about the shaft.

* * * * *